United States Patent [19]

Klein et al.

[11] Patent Number: 5,415,750
[45] Date of Patent: * May 16, 1995

[54] BATHS FOR ELECTROPHORETIC LACQUERING CAPABLE OF CATHODIC DEPOSITION WITH ADDITIVES FOR ENHANCING SURFACE APPEARANCE, AND THE USE OF SAID ADDITIVES IN COATING PROCESSES

[75] Inventors: Klausjoerg Klein; Johann Hirtl; Heinz-Peter Katzmann, all of Wuppertal, Germany

[73] Assignee: Herberts AG, Wuppertal, Germany

[ * ] Notice: The portion of the term of this patent subsequent to Mar. 24, 2009 has been disclaimed.

[21] Appl. No.: 165,070

[22] Filed: Dec. 9, 1993

Related U.S. Application Data

[63] Continuation of Ser. No. 989,307, Dec. 11, 1992, abandoned.

[30] Foreign Application Priority Data

Dec. 11, 1991 [DE] Germany .................. 41 40 753.9

[51] Int. Cl.$^6$ .............................................. C25D 13/10
[52] U.S. Cl. ............................... 204/181.7; 204/181.4; 524/513; 524/901
[58] Field of Search ................. 204/181.7, 181.4; 524/901, 513

[56] References Cited

U.S. PATENT DOCUMENTS

| | | | |
|---|---|---|---|
| 4,857,567 | 8/1989 | Laugal et al. ................ | 204/181.7 |
| 4,920,162 | 4/1909 | Clark et al. ................... | 523/404 |
| 5,039,720 | 8/1991 | Saatweber et al. ........... | 523/404 |
| 5,098,537 | 3/1992 | Hirtl et al. .................... | 204/181.4 |

*Primary Examiner*—John Niebling
*Assistant Examiner*—Kishor Mayekar
*Attorney, Agent, or Firm*—Richard A. Speer; Keck, Mahin & Cate

[57] ABSTRACT

Aqueous baths for electrophoretic lacquering containing binding agents capable of cathodic deposition and containing as additives for enhancing surface appearance, in particular as anti-cratering agents, 0.1 to 3% by weight of one or several (meth)acrylic copolymers with an amine number of 15–150 and an OH-number of 15–450, together with 0.1 to 2% by weight of one or several polyesters with β-hydroxyalkyl ester groups, with an acid number of 0 to 3 and a weight average molecular weight of 1000 to 10000, and/or together with 0.1 to 5% by weight of one or several homopolymers or copolymers of one or several alkylvinyl ethers with 1–5 carbon atoms in the alkyl residue, with a weight average molecular weight of 500 to 10000, whereby the percentages by weight relate to the solids content of the binding agents, and process for the coating of substrates that conduct electricity.

8 Claims, No Drawings

5,415,750

BATHS FOR ELECTROPHORETIC LACQUERING CAPABLE OF CATHODIC DEPOSITION WITH ADDITIVES FOR ENHANCING SURFACE APPEARANCE, AND THE USE OF SAID ADDITIVES IN COATING PROCESSES

This is a continuation of application Ser. No. 07/989,307, filed on Dec. 11, 1992, now abandoned, the text of which is hereby incorporated by reference.

FIELD OF THE INVENTION

The invention relates to the technical field of additives for enhancing surface appearance in cathodic electrophoretic lacquering (CEL), in particular the addition of anti-cratering agents.

BACKGROUND OF THE INVENTION

Cathodic electrophoretic lacquering (CEL) is a process which, above all, is frequently applied for the purpose of priming automobile bodies, in which process synthetic resins having cationic groups and capable of being diluted with water are deposited with the aid of direct current on bodies that conduct electricity. This principle is described in the literature and is widespread in practice. With this process, a workpiece with a surface that conducts electricity, made of metal or an electrically-conductive synthetic material, is placed into an aqueous electrophoretic bath, is connected as cathode to a source of direct current, and then lacquer is coagulated on the surface by allowing a current to flow (EP-B-0 066 859, EP-A-0 004 090, DE-A-32 15 891). The electrophoretic bath consists of an aqueous dispersion, e.g. a suspension or emulsion, or of an aqueous solution of one or several binding agents which have for example been made water-dispersible by the partial formation of salt with organic or inorganic neutralising agents and, optionally, of pigments, fillers, additives, solvents and other agents dispersed therein.

Lacquer materials of this composition should result in smooth surfaces being formed after deposition and crosslinking of the resulting film. These surfaces conceal imperfections from the lower layers evenly. They frequently serve to produce a ground for subsequent coatings which are intended to produce a high-quality surface lacquer. In practice, however, surface imperfections frequently occur in the stoved CEL film, in particular craters or uneven surfaces. The causes of these coating imperfections may lie in the electrophoretic lacquering materials used, but it is often the case that these imperfections stem from impurities introduced into the electrophoretic-lacquering bath. Examples of impurities from the lacquering material are gel particles arising from production of the binding agent, damaged resin particles arising from production of the pigment paste, impurities in the pigments, as well as foreign bodies from equipment serving to produce suitable materials. Foreign bodies introduced subsequently are, e.g. deep-drawing greases, corrosion-protection greases, seam sealants and substances from previous treatment.

A further class of impurities are those which after deposition of the electrophoretic lacquer coating are deposited from the air on the lacquer film which as yet is not crosslinked, for example aerosols containing fluorine or silicone, as well as lubricants from the transport systems which are necessary for movement of the parts to be coated.

These materials can get onto the lacquer film prior to stoving and then during stoving can cause, for instance as a result of incompatibility, surface imperfections such as craters. Impairment caused by these materials cannot be foreseen but has to be determined by experiment.

These surface imperfections require costly further treatment in order to achieve a smooth surface of the subsequent layers. In order therefore to ensure continuous production it is necessary to avoid surface imperfections of this type. Since it is rather difficult to prevent the many causes of craters, attempts are generally made to avoid crater formation by the use of additives.

Known additives for avoiding the formation of craters are, e.g. silicone oils or organic substances containing fluorine. Although these suppress crater formation in the applied coating, they frequently result in considerable surface imperfections in subsequent layers. Besides, it can be ascertained that the subsequent layers adhere poorly to such undersurfaces. For this reason these additives are not suitable for CEL coatings.

Hence attempts have been made to find other additives which do not contain silicone, in order to avoid these frequent surface imperfections. In U.S. Pat. No. 4,810,535 reaction products of polyoxyalkylene polyamine with epoxy resins are described as additives to CEL systems. It is intended thereby to avoid cratering. In EP-A-0 324 951 polyoxyalkylene polyamines are described as an additive to CEL baths in order to obtain film surfaces free of imperfections. In DE-A-38 30 626 modified acrylates are described as additives to CEL baths, which can be added to the lacquer material in a form which may or may not be neutralised. Also in this case it is intended to avoid surface imperfections of various types. In EP-A-0 301 293 cathodic electrophoretic baths are described which contain homopolymers or copolymers of an alkylvinyl ether by way of additive. In EP-A-0 422 533 cationic (meth)acrylic copolymers as anti-cratering agents for CEL baths are described. It is a feature of all these materials that they have to be used in relatively large quantities in order to have an anti-cratering effect. The problem in this connection is that adhesion to subsequent layers, e.g. fillers or polyvinylchloride materials, is clearly impaired.

Independently of the cause of the craters it can be established that the degree of efficiency of the known anti-cratering agents for CEL systems is inadequate in practice. Even increased quantities of these additives do not result in total elimination of cratering. Therefore the substrates frequently have to be subjected to further treatment, e.g. by grinding or by application of further coatings.

In the as yet unpublished DE patent application 40 18 876 there are described as anti-cratering agents mixtures of polyvinyl ethers with a weight average molecular weight of 500–10000 together with polyesters having a weight average molecular weight of 1000–10000 and an acid number of up to 3, which contain $\beta$-hydroxyalkyl ester groups and are preferably not wholly compatible with the CEL binding agent.

Since craters are brought about by the most diverse causes and various causes of cratering often occur at the same time in practice, or various additional substances which cause cratering are added in the course of the lacquering process, there is a need for further anti-cratering agents which can be used in small quantities and which can eliminate the most varied causes of craters.

SUMMARY OF THE INVENTION

The object therefore was to provide anti-cratering agents which at suitably low dosage can combat the most diverse causes of craters without resulting in adhesion problems as regards subsequent layers. It has been shown that this problem can be solved by the use of A) one or several (meth)acrylic copolymers with an amine number of 15-150 mg KOH/g and an OH-number of 15-450 mg KOH/g, which in each case are used together with B) one or several polyesters with a weight average molecular weight of 1000-10000 and an acid number of up to 3, which contain β-hydroxyalkyl ester groups and are preferably not wholly compatible with the CEL binding agent, and/or together with C) one or several polyvinyl ethers with a weight average molecular weight of 500-10000. According to the invention it is possible to add to a CEL bath the components A)+B), A)+C), or all three components A)+B)+C) combined with one another.

Both with the use of two components and with the use of three components, the (meth)acrylic copolymers are preferably used in a quantity of 0.1-3% by mass, the polyester in a quantity of 0.1 to 2%, preferably 0.1 to 1% by mass and the polyvinyl ether in a quantity of 0.1-5% by mass, relative to the mass of the CEL binding agent inclusive of possible crosslinking agent. The parts by mass (weight) of the (meth)acrylic copolymers in relation to the polyesters and the parts by mass of the (meth)acrylic copolymers in relation to the homopolymers or copolymers of the vinyl ether are preferably in each case in the ratio 1:10 to 10:1, in each case relative to the resin solids, in the case of triple combination of polyvinyl ether with polyester and (meth)acrylic copolymers the proportions by mass are preferably in a ratio to one another of 1:1:10 to 1:10:1 or 10:1:1.

Polyesters such as can be used according to the invention, having an acid number of up to 3, essentially free of acidic groups and containing β-hydroxy ester groups, are described in EP-A-0 012 463, EP-A-0 066 859 and DE-A-34 36 345 as crosslinking agents.

Within the scope of the invention it has been shown that polyesters that are essentially acid-free with at least 2 terminal or lateral saturated or unsaturated β-hydroxyalkyl ester groups per molecule and a weight average molecular weight of 1000-10000 have an effect as surface-enhancing agents when they are used in CEL systems in a quantity ≦2% by weight relative to the CEL binding agent plus optionally present crosslinking agent (calculated in each case in relation to the resin solids), i.e. in a mixture with (meth)acrylic copolymers with an OH-number of 15-450 and an amine number of 15-150 and a number average molecular weight of 1000-500000 in a quantity ≦3% by weight relative to the CEL binding agent plus optionally present crosslinking agent (calculated in each case in relation to the resin solids) or, that (meth)acrylic copolymers with an OH-number of 15-450 and an amine number of 15-150 and a number average molecular weight of 1000-500000 in a quantity ≦3% by weight relative to the CEL binding agent plus optionally present crosslinking agent (calculated in each case in relation to the resin solids) have an effect as surface-enhancing agents when they are used in CEL systems, i.e. in a mixture with homopolymers or copolymers of alkylvinyl ethers with an alkyl residue of 1-5 carbon atoms in a quantity ≦5% by weight (likewise relative to the CEL binding agent plus optionally present crosslinking agent, calculated in each case in relation to the resin solids) or, that a triple combination of these substances has an effect as surface-enhancing agent when used in CEL systems in the above-stated percentage ranges by weight relative to the CEL binding agent plus optionally present crosslinking agent (calculated in each case in relation to the resin solids).

During CEL deposition in which use is made of one of these mixtures smooth surfaces are formed which are free from craters and imperfections and which exhibit no adhesion faults with regard to subsequent layers. The additive mixtures used according to the invention show an unexpected effect, since even if larger amounts of any of the three individual components are used this does not result in total elimination of surface imperfections. Only with a mixture of the described (meth)acrylic copolymer with the described polyester or the described polyvinyl ether or a mixture of all three substances are all surface imperfections eliminated.

With the use of the mixture of chemically different anti-cratering agents according to the invention a synergistic effect occurs in such a manner that a good anti-cratering effect is achieved in the case of this combined use despite the fact that these substances are only used in unusually small quantities.

The anti-cratering agent used according to the invention can be used in the form of the prepared mixture; but all three individual components can also be added in the stated amounts to the electrophoretic-lacquering bath in double and triple combinations. In this connection the sequence of addition is not significant. Since the anti-cratering agent according to the invention is used in small amounts, there are no disadvantages resulting from higher doses which can arise when anti-cratering additives are used, such as adhesion faults or a raw surface.

According to the invention use is made of conventional baths for electrophoretic lacquering which, for example, consist of an aqueous solution or dispersion of conventional synthetic resins which are capable of cathodic deposition and which are self-crosslinking or which crosslink by external means, conventional pigments and/or fillers as well as additional conventional lacquering additives and auxiliary materials. The surface-enhancing agents can be added to the baths for electrophoretic lacquering from the outset during production, or if necessary later on, immediately before being used for electrophoretic lacquering. As already stated, the three individual components of the anti-cratering agent according to the invention can be added separately or as a mixture.

The anti-cratering agents according to the invention are used in small amounts. In this connection it can be advantageous in individual cases to choose the amount of the mixture or the amount of the individual components within the stated limits by experiment in such a way that craters are no longer present in the coating deposited.

The amount of the additives is chosen in such a way that craters are no longer present in the coating deposited. If the chosen amount is too high, surface imperfections will result, such as a negative influence on the adhesion of subsequent layers. If the amount is too small, the anti-cratering effect is inadequate. In this case the amount of the anti-cratering agent used should be increased.

The polyalkylvinyl ethers used in the anti-cratering agent according to the invention are polymers of alkylvinyl ethers with an alkyl residue of 1 to 5, preferably 2 to 4 carbon atoms. These are homopolymers or polymers of various alkylvinyl ether monomers. In addition, copolymers with a comonomer proportion of up to 25% can be used. Suitable as comonomers are olefinically unsaturated monomers which can be copolymerised with the alkylvinyl ethers and which preferably contain no functional groups, in particular no groups making them soluble in water. These are, for example, styrene, alkyl acrylates and/or alkyl methacrylates, whereby the alkyl residues are, e.g. methyl or ethyl residues. The weight average molecular weight of the polymers and copolymers obtained should lie between 500 and 10000. The polyalkylvinyl ethers used have no functional groups in the lateral chain; they are not soluble in water.

The essentially acid-free polyesters with lateral or terminal $\beta$-hydroxyalkyl ester groups which are used in the anti-cratering agent according to the invention are esters of aromatic polycarboxylic acids such as isophthalic acid, terephthalic acid, trimellitic acid or mixtures thereof. These are, e.g. condensed with ethylene glycol, neopentyl glycol, trimethylolpropane and/or pentaerythritol. The carboxyl groups are then reacted with optionally substituted 1,2-glycols subject to the formation of $\beta$-hydroxyalkyl compounds. The 1,2-glycols can be substituted with saturated or unsaturated alkyl, ether, ester or amide groups. Also possible is the formation of hydroxyalkyl ester compounds in which the carboxyl groups are reacted with substituted glycidyl compounds such as glycidyl ethers or glycidyl esters.

The product preferably contains more than three $\beta$-hydroxyalkyl ester groups per molecule and has a weight average molecular weight of 1000 to 10000, preferably 1500 to 5000. The essentially acid-free polyesters with lateral or terminal $\beta$-hydroxyalkyl ester groups which are used according to the invention can be produced as described, e.g. in EP-A-0 012 463. The compounds described therein also represent examples of polyesters which can be used according to the invention.

The polyesters suitable for the purpose according to the invention are characterised in that they preferably have only limited miscibility with CEL binding agents. In individual cases the compatibility can be established in the following way: the binding agent, inclusive of optionally present crosslinking agents is mixed with the polyester in a weight ratio of 9:1 and diluted with butyl glycol to 75% solids. The test must first result in a homogeneous mixture, which however when left to stand separates again within 2 days. If total compatibility obtains (i.e., no separation within 2 days), there is little anti-cratering effect. If there is total incompatibility (i.e. no homogeneous miscibility), a fault may arise with the adhesion of subsequent layers.

The (meth)acrylic copolymers used in the anti-cratering agent according to the invention have an amine number of 15–150 and an OH-number of 15–450. They exhibit primary, secondary and/or tertiary amino groups and can for example be produced from radically polymerisable monomers. The number average molecular weight (Mn) lies preferably around 1000 to 500000. (Meth)acrylic copolymers are preferably used which have a viscosity of 0.1 to 10 Pa.s in 50% solution in butoxyethanol at 25° C. and a glass transition temperature of −50° to +150° C.

The (meth)acrylic copolymers can be obtained by, for example, copolymerisation of monomers containing amino groups and monomers containing hydroxyl groups or monomers containing amino groups and hydroxyl groups with in each case monomers which besides an unsaturated double bond contain no other reactive groups. Use is preferably made of either 6 to 40 parts by weight of monomers containing amino groups and 4 to 50 parts by weight of monomers containing hydroxyl groups or 8 to 60 parts by weight of monomers containing amino groups and hydroxyl groups per 10 to 90 parts by weight of the comonomers without other reactive groups. Of the latter, up to 10 parts by weight can for example be replaced by polyunsaturated monomers.

Such amino-poly(meth)acrylates capable of being diluted with water can for example be produced as described in DE-A-15 46 854, DE-A-20 57 799 or DE-A-23 25 177. Suitable radically polymerisable monomers are, for example, ethylenically unsaturated monomers that are suitable for copolymerisation, such as described by the Q and e scheme according to Alfrey and Price (Brandrup and Immergut, Polymer Handbook, 3rd edition, John Wiley and Sons, New York, 1989).

DETAILED DESCRIPTION OF THE PREFERRED EMBODIMENTS

The (meth) acrylic copolymer used in the anti-cratering agent according to the invention is preferably a poly(meth)acrylate resin capable of being diluted with water after being neutralised with organic acids and which has an amine number of 15 to 150, preferably 40 to 100 (mg KOH per g of solid resin), a hydroxyl number of 15 to 450, preferably 50 to 200 (mg KOH per g of solid resin), an average molecular weight (Mn) of 1000 to 500000, in particular 3000 to 100000, determined by gel permeation chromatography, calibrated with polystyrene fractions and a viscosity of 0.1 to 10 Pa.s, in particular 0.5 to 5 Pa.s, in 50% solution in butoxyethanol at 25° C., and a glass transition temperature, calculated from the glass transition temperatures of the homopolymers, of −50° to +150° C., in particular −20° to +50° C.

In this connection, suitable average molecular weights or viscosities can also be obtained by mixing resins with relatively high and relatively low viscosity or molecular weight.

In order to produce the (meth)acrylic copolymers, use can be made, for example, of mixtures of various unsaturated monomers which either contain basic nitrogen atoms or into which such a basic nitrogen atom can be introduced by chemical reactions. Thus the (meth) acrylic copolymers are based for example in each case on radically polymerisable a) 6 to 40 parts by weight of monomers containing amino groups, b) 4 to 50 parts by weight of monomers containing hydroxyl groups and c) 10 to 90 parts by weight of other radically polymerisable monomers which besides an unsaturated double bond contain no other reactive groups whereby optionally up to 10 parts by weight of component c) are replaced by radically polymerisable polyunsaturated monomers.

The radically polymerisable monomers containing amino groups and monomers containing hydroxyl groups must not be submitted as a mixture. Use can also be made of types of monomers which simultaneously contain both amino groups and hydroxyl groups. In this case use is made of 8 to 60 parts by weight of the monomers containing amino groups and hydroxyl groups and 10 to 90 parts by weight of the radically polymerisable monomers which contain no other reactive groups, whereby up to 10 parts by weight of the latter are, optionally, radically polymerisable polyunsaturated monomers.

By way of radically polymerisable monomers containing amino groups or N-groups use is made, for example, of monomers of the following general formula:

$$R-CH=CR'-X-A-N(R'')_2$$

wherein
$R = -R'$ or $-X-C_nH_{2n+1}$
$R' = -H$ or $-C_nH_{2n+1}$
$R'' = -R'$, $-C_nH_{2n}OH$ and/or $-C_nH_{2n}NR_2$
$X = -COO-$, $-CONH-$ or $-O-$ $$A = -C_nH_{2n}- \text{ or } -C_nH_{2n}-\underset{\underset{OH}{|}}{CH}-CH_2- \text{ and}$$

$n = 1$ to 8, preferably 1 to 3.

Examples of unsaturated monomers containing N-groups are N-dialkyl- or N-monoalkylaminoalkyl (meth) acrylates or the corresponding N-alkanol compounds such as N-diethylaminoethyl methacrylate or N-tert-butylaminoethyl acrylate, N-dialkyl- or N-monoalkylaminoalkyl (meth) acrylamide or the corresponding N-alkanol compounds such as N-dimethylaminoethanol acrylamide and/or heterocyclic compounds containing vinyl groups with one or several basic nitrogen atoms, such as N-vinyl imidazole.

Radically polymerisable monomers containing hydroxyl groups should be taken to mean those which besides a polymerisable ethylenically unsaturated group also contain at least one hydroxyl group on a C2 to C20 linear, branched or cyclic carbon skeleton. These are mainly unsaturated esterification products of the general formula $$R-CH=CR'-X-B$$

wherein
R, R' and X have the meanings stated above
and
B is a linear or branched $C_{1-6}$ alkyl group with 1 to 3 OH-groups.

Particularly suitable are hydroxyalkyl (meth)acrylates such as 2-hydroxyethyl acrylate, 2-hydroxypropyl methacrylate, butanediol-1,4-monoacrylate, 2,3-dihydroxypropyl methacrylate, pentaerythritol monomethacrylate, polypropyleneglycol monoacrylate or even dihydroxyalkyl fumarate. Use can also be made, however, of N-hydroxyalkyl (meth)acrylamides or N-hydroxyalkylfumaric monoamides or diamides such as N-hydroxyethyl acrylamide or N-(2-hydroxypropyl) methacrylamide, as well as reaction products of hydroxyalkyl (meth) acrylates with ε-caprolactone.

Other compounds containing hydroxyl groups are allyl alcohol, monovinyl ethers of polyalcohols, in particular of diols such as monovinyl ethers of ethylene glycol or butanediol, as well as allyl ethers or esters containing hydroxyl groups, such as 2,3-dihydroxypropyl monoallylether, trimethylolpropane monoallylether or 2,3-dihydroxyallyl propanate. Particularly suitable are hydroxyethyl-, hydroxypropyl- and/or butanediol-1,4-(meth)acrylate.

Ethylenically polyunsaturated monomers should be taken to mean compounds with at least two radically polymerisable double bonds according to the general formula $$R-CH=CR'-D-(-CR'=CH-R)_m,$$

$m = 1$ to 3, preferably $m = 1$, whereby in addition to the meanings stated above, D is the general chemical parent structure supporting the reactive double bond. Examples of D are the o-, m- or p-phenylene residue and residues of the formula $-X-$ alkyl$-X'-$, wherein alkyl preferably has 2 to 18 carbon atoms and X and X' are the same or different linking groups, e.g. $-O-$, $-CONH-$, $-COO-$, $-NHCOO-$ or $-NH-CO-NH-$. D can, for example, be a benzene ring such as in divinylbenzene, which can optionally also be substituted, such as p-methyldivinylbenzene or o-nonyldivinylbenzene. Further examples of suitable polyunsaturated monomers are reaction products formed from polyalcohols, particularly dialcohols, with α,β-unsaturated carboxylic acids such as those already defined. Examples are ethanediol diacrylate, glycol dimethacrylate, 1,4-butanediol diacrylate, 1,6-hexanediol diacrylate, neopentylglycol dimethacrylate, triethyleneglycol dimethacrylate, polyglycol-400-diacrylate, glycerine dimethacrylate, trimethylolpropane triacrylate and/or pentaerythritol diacrylate. Polyfunctional monomers containing urethane and amide groups are produced by reaction of, for example, hexanediisocyanate or β-isocyanato-ethyl methacrylate with hydroxyethyl (meth)acrylate or (meth) acrylic acid. Examples of suitable compounds of different structure are allyl methacrylate, diallyl phthalate, butanediol divinylether, divinylethylene carbamide, divinylpropylene carbamide, diallyl maleate, bis-maleimides, glyoxabisacrylamide and/or the reaction product of epoxy resin with (meth)acrylic acid or half-esters of fumaric acid. Use is preferably made of difunctional unsaturated monomers such as butanediol diacrylate or hexanediol diacrylate. With the use of glycidyl methacrylate and methacrylic acid the corresponding glycerine dimethacrylate is formed automatically during polymerisation. The type and amount of polyunsaturated monomers should be carefully adjusted in accordance with the reaction conditions (catalysts, reaction temperature, solvent) in order to obtain the desired viscosity without gelation. Total incorporation of the polyunsaturated monomers is preferred, i.e. the polymerised product contains practically no more double bonds.

The radically polymerisable monomers, which besides the ethylenically unsaturated bond contain no other active groups, can be chosen for example from the following: alkyl acrylate, alkyl methacrylate, dialkyl maleate and/or dialkyl fumarate, whereby the alkyl residues consist of 1 to 20 carbon atoms and are arranged in a linear or branched aliphatic chain and/or as a cycloaliphatic and/or (alkyl)aromatic residue. "Hard" monomers with a high glass transition temperature as polymers are, for example, monomers of the vinyl-aromate type, such as styrene, α-substituted styrenes such as α-methylstyrene, o-, m- and p-alkylstyrenes such as vinyltoluene or p-tert.-butylstyrene, halogenated vinylbenzenes such as o- or p-chlorostyrene, short-chain methacrylates such as methyl methacrylate, ethyl methacrylate, propyl methacrylate, butyl methacrylate, cyclohexyl methacrylate, isobornyl methacrylate, -dihydrodicyclopentadienyl methacrylate, (meth) acrylamide and/or also (meth)acrylonitrile. "Soft" monomers, on the other hand, are acrylates with a long alcohol chain, such as n-butyl acrylate, isobutyl acrylate, tert.-butyl acrylate, 2-ethylhexyl acrylate and/or lauryl acrylate. Unsaturated ethers such as ethoxyethyl methacrylate or tetrahydrofurfuryl acrylate can also be used. Monomers of the vinylester type, preferably vinylester α-branched monocarboxylic acids such as Versatic acid vinylester, can also be incorporated by polymerisation if suitable reaction conditions and reaction comonomers are chosen.

Copolymerisation is effected in known manner by solution polymerisation subject to the addition of radical initiators as well as, optionally, agents for regulating molecular weight at temperatures from 50° to 180° C. It takes place in a liquid in which monomers and polymers jointly dissolve. The content of monomers or polymers after completion of polymerisation amounts in this case to about 50 to 90% by weight. Solution polymerisation in organic solvents which can be diluted with water is preferred. Such solvents are, for example, ethylene glycol, methoxyethanol, butoxyethanol, diethylene glycol, triethylene glycol, diethyleneglycol dimethylether, propylene glycol, methoxypropanol, ethoxypropanol, dipropyleneglycol monomethylether, dipropyleneglycol dimethylether, diacetone alcohol, ethanol, isopropanol, sec. butanol, tert. butanol, acetone, methoxypropanone, dioxan, tetrahydrofuran, N-methyl pyrrolidone or mixtures thereof.

Generally the solvent or solvent mixture is heated to reaction temperature and then the monomer mixture is allowed to flow in for several hours. In order to be able to work at reflux temperature, the initiator is adjusted to the boiling-temperature of the solvent mixture. In this case it normally decomposes with a time of half-change ranging from 30 minutes to 10 hours. The initiator is either dissolved cold in the monomer mixture or for reasons of safety charged in measured doses separately while the monomers flow in. By way of catalysts that are soluble in organic solvents there are added 0.1 to 5% by weight, preferably 0.5 to 3% by weight of peroxides and/or azo-compounds, relative to the quantity of monomers used. Used by way of peroxides are, for example, benzoyl peroxide or di-tert.-butyl peroxide, hydroperoxides such as tert.-butyl hydroperoxide or cumene hydroperoxide and peresters such as tert.-butylperoctoate or tert.-butylperbenzoate. Thermally decomposing azo-compounds are, for example, 2,2'-azo-bis-(2-cyanopropane) or 1,1'-azo-bis-cyclohexane carbonitrile. By way of initiators, use can also be made of radical-forming compounds of the dibenzyl type, such as 1,2-bis(4-methylphenyl)-1,2-dicarbethoxy-1,2-dicyano ethane. The molecular weight can be reduced in known manner by the use of regulators. Mercaptans, halogen-containing compounds and other radical-transmitting substances are preferably used for this purpose. Particularly preferred are n- or tert.-dodecylmercaptan, tetrakis-mercaptoacetyl pentaerythritol, tert.-butyl-o-thiocresol, thiosalicylic acid, butene-1-ol or dimeric α-methylstyrene.

Production of amino(meth)acrylate resins can also be effected by reaction analogous to polymerisation. Thus it is possible, for example, to react a copolymer containing acrylamide groups with formaldehyde and a secondary amine and/or amino alcohol. A particularly preferred process is described in DE-A-34 36 346. In this process, monoethylenically unsaturated monomers containing epoxide groups are firstly incorporated into the copolymer by polymerisation. Thereupon reaction is effected with excess primary and/or secondary monoamines and/or monoamino alcohols and then the amine excess is distilled off.

Radically polymerisable monomers containing epoxide groups are mono- and/or diglycidyl compounds of α,β-unsaturated acids, acid amides, alcohols or amines such as glycidyl esters, β-methylglycidyl esters of (meth) acrylic acid, fumaric acid and/or maleic acid, monoalkyl fumarates and/or maleates, as well as glycidyl compounds of (meth)acrylamide, fumaric diamide, maleic diamide or maleimide and/or glycidyl ethers of unsaturated alcohols such as vinyl and/or allyl alcohol. Other suitable compounds are monoglycidyl esters of monoesters of dicarboxylic acid with unsaturated alcohols such as allylglycidyl phthalate. Vinyl and allyl esters of epoxidised fatty acids can, however, also be used, such as 2,3-epoxyallyl butyrate or epoxyallyl stearate. Also suitable are diolefins having one double bond which has been epoxidised, such as vinylethylene oxide, 1-methyl-1-vinylethylene oxide or 3,4-epoxy-1-vinylcyclohexane. Glycidyl acrylate and glycidyl methacrylate are preferred for copolymerisation. The proportion of unsaturated monomers containing epoxide groups in the copolymer generally amounts to 8 to 50% by weight. The lower limit is preferably around 12% by weight, the upper limit around 35% by weight. Polymerisation must have been fully completed before the reaction with amines takes place, since otherwise reversible secondary reactions occur with the secondary amines at the activated double bonds of the monomers.

Particularly effective as secondary amines for reacting with the epoxide groups are secondary amines of the formula

where
R=—H or —R'
R'=—$C_nH_{2n+1}$, —$C_nH_{2n}OH$ and/or —$C_nH_{2n}$—N=$CR_2$
and
n=1 to 8, preferably 1 to 2.

The following amines can, for example, be used for the reaction: $C_1$ to $C_6$ dialkyl amines with the same or different alkyl groups in the molecule, such as dimethyl, diethyl, diisopropyl, dibutyl, methylethyl, methylpropyl and methylbutyl amine, monocycloaliphatic amines such as morpholine, piperidine, pyrrolidine, oxazolidine and/or monoalkanol amines such as N-methyl-aminoethanol and/or dialkanol amines such as diethanol amine, diisopropanol amine. Examples of primary amines or amino alcohols are $C_1$ to $C_8$ alkyl amines such as ethyl amine, 2-ethylhexyl amine or aminoethanol. In any case, $C_1$ to $C_4$ alkyl groups, in particular $C_1$ and/or $C_2$ alkyl groups, are preferred. Particularly preferred are secondary amines such as dimethyl amine, diethyl amine, methylethyl amine or N-methyl-aminoethanol.

The primary amines mentioned above are mostly used in a mixture with secondary amines, since otherwise the products formed are too highly viscous.

A similar reaction can, for example, preferably be carried out in equivalent amounts with ketimines of polyamines which contain a secondary amino group and one or several primary amino groups, such as the monoketimine formed from methyl isobutyl ketone and methylaminopropyl amine or the diketimine formed from methyl isobutyl ketone and diethylene triamine.

If one takes into account that during reaction with amine each epoxide group gives rise to a secondary OH-group, it can be appropriate to incorporate by polymerisation at least one additional hydroxyl group per molecule, preferably a primary hydroxyl group, with the aid of other unsaturated monomers. The number of epoxide groups determines the number of amino groups entering into reaction therewith and thereby also the solubility of the product. At least one epoxide group per molecule should be present. It is often advantageous to combine a high hydroxyl number with a low amine number.

According to the invention the functionalised polyester is used in quantities $\leq 2\%$ by weight, preferably $\leq 1\%$ by weight, relative to the solids content of the CEL binding agent inclusive of crosslinking agent. Although a reaction of this additive with the CEL binding agents during heating to relatively high temperatures cannot be excluded, as a consequence of the small quantity of this additive it does not act as a crosslinking agent. The polyalkylvinyl ether is not functionalised and therefore does not generally react with the CEL binding agent during stoving. The quantity used amounts to $\leq 5\%$ by weight, preferably $\leq 3\%$ by weight, in each case relative to the solids content of the CEL binding agent inclusive of crosslinking agent. The (meth)acrylic copolymer is used in quantities $\leq 3\%$ by weight, preferably $\leq 1.5\%$ by weight, relative to the solids content of the CEL binding agent inclusive of crosslinking agent. Although this additive can be deposited cataphoretically and by virtue of its chemical structure can be involved in crosslinking during stoving, as a consequence of the small quantity of this additive it does not act as a binding agent.

One skilled in the art can easily ascertain the optimal mixture by experimentation. For instance, an additive can be added to such an extent that a smooth surface is obtained having only a few craters. By the addition of a further small quantity of the other additive or additives, other surface imperfections are also prevented. The film then receives a smooth, homogeneous surface and does not interfere with the adhesion of subsequent layers.

The binding agents used in the baths for electrophoretic lacquering contain for this purpose conventional basic resins with basic groups which for example contain sulphur, nitrogen or phosphorous. Preferred are basic groups which contain nitrogen. These groups may be present in quaternised form, or they are converted into ionic groups with a conventional neutralising agent such as organic monocarboxylic acids.

Basic base resins are resins containing primary, secondary or tertiary amino groups, the amine numbers of which lie, e.g. between 20 and 250. The weight average molecular weight of the base resins preferably lies around 300 to 10000. Basic groups, besides $-NH_2$, $-NRH$, $-NR_2$ and $NR_3^+$, also include, e.g. $-SR_2^+$, $-PR_3^+$, wherein R represents for example an alkyl residue with 1 to 4 carbon atoms and the residues R can be the same or different. Basic groups containing nitrogen are preferred. By way of neutralising agents, which function as anions in the aqueous binding-agent solutions or dispersions, use can be made of inorganic and/or organic acids known to theory and utilised in practice. In practice, monovalent acids are mainly used which bring about good solubility or dispersibility of the binding agent in water. Formic acid, acetic acid, lactic acid and alkylphosphoric acids are preferably used.

Base resins are, e.g. aminoepoxide resins, aminoepoxide resins with terminal double bonds, aminopolyurethane resins, polubutadiene resins containing amino groups, and modified reaction products of epoxide, carbon dioxide and amine.

Aminoepoxide resins are preferred, in particular those based on Bisphenol A. These base resins are described in the literature, e.g. in EP-A-0 082 291 and DE-A-32 34 395.

The base resins can be self-crosslinking or capable of being crosslinked by external means. Suitable as crosslinking agents for base resins which crosslink externally are conventional crosslinking agents such as triazine resins, blocked isocyanates, crosslinking agents with terminal double bonds and crosslinking agents with active hydrogen capable of Michael addition with activated double bonds. These are described, for example, in EP-A-0 245 786, EP-A-0 004 090, EP-A-0 319 929, DE-A-37 20 956 and in EP-A-0 193 685, U.S. Pat. No. 4,810,535 and DE-A-38 30 626. The various crosslinking agents can be used individually or mixed together with the base resins.

The electrophoretic lacquers used according to the invention can contain pigments. By way of pigments for CEL deposition, use can be made of conventional pigments and/or fillers, such as carbon black, titanium dioxide, iron oxide red, kaolin, talc or silicon dioxide. The pigments are preferably dispersed and ground in conventional pigment-paste resins. Such resins are described, for example, in EP-B-0 183 025.

The production of pigment pastes and the production of baths for cathodic electrophoretic lacquering are familiar to one skilled in the art.

For example, pigments and/or fillers can be dispersed in conventional binding agents used in pasting processes and then ground on a suitable aggregate, e.g. a pearl mill. The pigment paste so obtained can then be added to the CEL binding agents in various ways. For example, it is mixed with the CEL binding agents. The CEL coating bath can then be produced from this material by diluting with fully demineralised water. An example of another way of proceeding firstly converts the neutralised and thereby water-soluble binding agents or binding-agent mixtures into a dispersion. This is diluted further with fully demineralised water and then the aqueous pigment paste is added. This results likewise in a CEL bath capable of being used for coating. The baths for electrophoretic lacquering used according to the invention also contain, in addition to pigments and fillers, the stated neutralising agents; they can additionally contain solvents which are conventionally used in CEL baths and/or additional conventional lacquering additives or auxiliary materials such as defoamers or catalysts.

As already stated, the anti-cratering additives used according to the invention can be introduced into the CEL baths either individually or jointly. To this end they can for example be dispersed in the binding-agent mixture before or after being neutralised and then converted together with the binding agent into the dispersion phase. An example of a different processing mode is that after conversion of the binding agents into the aqueous phase the additives are conveyed to the dispersion individually or jointly, e.g. with an auxiliary agent such as a portion of the dispersed neutralised resins or the neutralised paste resin or a suitable solvent, or also in a form neutralised with acid and diluted with water. After thorough homogenisation the additives are worked in stably.

A further possibility consists in working the anti-cratering additives into the pigment paste. This can be effected more advantageously prior to grinding of the pigment paste, in order thereby to ensure that the additives are distributed homogeneously in the pigment paste. The pastes so obtained are stable and exhibit the desired characteristics after being added to the bath for producing an electrophoretic lacquer coating.

In principle it is possible to add the two or three additives jointly or separately. It is also possible to add the additives later to CEL baths which are ready for coating. For this they have only to be converted into a form which can be diluted with water, for example with the aid of solvents, water-dispersible emulsifiers, soluble binding agents, soluble paste resins or neutralising agents as already used to neutralise the base resins. This way of proceeding is particularly suitable if it has been shown that surface imperfections occur when working with an already existing coating bath. After addition of the anti-cratering agent according to the invention these imperfections are eliminated.

Using the baths for electrophoretic lacquering that have been provided with anti-cratering agents according to the invention various substrates can be coated under normal conditions. These exhibit a smooth, crater-free surface after stoving. As a result of using the anti-cratering additives according to the invention, other lacquering characteristics, such as corrosion protection, resistance to impact of stones and adhesion of subsequent layers, are not affected. The anti-cratering agents according to the invention are hence particularly suitable for use in the automobile industry, for example for priming automobile bodies or parts thereof, with subsequent multi-layer lacquering. For instance, the electrophoretic lacquer coatings containing the anti-cratering agents according to the invention can be top-coated with conventional fillers. Examples of such fillers can be found in DE-A 33 37 394, 33 37 395, 38 05 629, 41 25 459 and 41 34 301.

The following Examples serve to elucidate the invention. All percentage figures and parts relate to weight unless otherwise stated. The solids content is determined analogously to DIN 53182 at 150° C.

EXAMPLE 1

Production of a Binding Agent

In accordance with EP-A-0 012 463, 391 g diethanolamine, 189 g 3-(N,N-dimethylamino)-propylamine and 1147 g of an adduct formed from 2 mol hexanediamine-1,6 and 4 mol glycidyl ester of Versatic acid (Cardura ® E10, available from Shell) are added to 5273 g Bisphenol-A epoxy resin (epoxide equivalent weight about 475) in 3000 g ethoxypropanol. The reaction mixture is held for 4 hours at 85° C. to 90° C. with stirring and then for 1 hour at 120° C. Dilution is then effected with ethoxypropanol to give a solids content of 60%.

EXAMPLE 2

Production of a Binding Agent (Crosslinking Agent)

To 431 g of a solution (75% in ethyl acetate) of a reaction product formed from 3 mol toluidene-diisocyanate with 1 mol trimethylolpropane (Desmodur L) are slowly added 160 g caprolactam at 70° C. with stirring. The reaction mixture is then held at 70° C. until the NCO-content has sunk practically to nil. Then 2-butoxyethanol (204 g) is added and the ethyl acetate is distilled off through a column until a solids content of 70% is obtained.

Production of CEL Dispersions

EXAMPLE 3a 1155 g of a resin according to Example 1 and 425 g according to Example 2 are mixed and then distilled off in a vacuum to give about 85% solids. Formic acid (50%) is added to this at elevated temperature in a quantity of 45 mmol per 100 g of solids and then dilution is effected with fully demineralised water to around 30% solids.

EXAMPLE 3b

The process described in Example 3a is followed, but to the binding agents are added 6.6 g of the anti-cratering component according to Example 5.

EXAMPLE 3c The process described in Example 3a is followed, but to the resins there are added 13.2 g of a commercially available polyethylvinyl ether ($M_w$ 1000–10000).

EXAMPLE 3d

The process described in Example 3a is followed, but 33 g of the aqueous solution according to Example 6a are added.

EXAMPLE 3e

The process described in Example 3a is followed, but 33 g of the aqueous solution according to Example 6c are added.

EXAMPLE 3f

The process described in Example 3b is followed, but 33 g of the aqueous solution according to Example 6a are added.

EXAMPLE 3g

The process described in Example 3c is followed, but 33 g of the aqueous solution according to Example 6a are added.

EXAMPLE 3h

The process described in Example 3a is followed, but to the resins are added 6.6 g of the anti-cratering component according to Example 5 and 13.2 g of a commercially available polyethylvinyl ether ($M_w$ 1000–10000). 33 g of the aqueous solution according to Example 6a are additionally added to the CEL dispersion obtained.

EXAMPLE 3i

The process described in Example 3b is followed, but instead of 6.6 g there are added 29.7 g of the anti-cratering component according to Example 5.

EXAMPLE 3k

The process described in Example 3c is followed, but instead of 13.2 g, 29.7 g of the commercially available polyethylvinyl ether ($M_w$ 1000–10000) are used.

EXAMPLE 4

Production of a Pigment Paste

To 188 g of a paste resin according to EP-B-0 183 025, Example 5 (80%), are added under a high-speed stirrer 55 g formic acid (50%) and 485 g of fully demineralised water. To this 30 g carbon black, 10 g pyrogenic silicic acid, 30 g dibutyl tin oxide powder, 30 g lead silicate and 500 g titanium dioxide are added. A solids content of about 48% is adjusted with about 200 g of fully demineralised water and grinding is effected in a pearl mill. A stable pigment paste is formed.

EXAMPLE 5

Production of a Polyester Containing β-hydroxyester Groups as Anti-Cratering Component 768 g trimellitic anhydride and 2000 g of a glycidyl ester of a branched, tertiary $C_{10}$-monocarboxylic acid (Cardura E10 ®) are heated carefully with stirring to 190° C., whereby from 90° C. an exothermic reaction sets in. The reaction charge is cooled to 140° C. and mixed with 2.75 g N,N-dimethylbenzyl amine. The reaction charge is held at 145° C. until an acid number below 3 mg KOH/g is obtained. If necessary, a calculated quantity of Cardura E10 ® is additionally added. The reaction product is diluted with 2-butoxyethanol to give a solids content of 80%.

Production of the (Meth)acrylic Polymer as Anti-Cratering Agent

EXAMPLE 6a 725 g butoxyethanol are heated under inert gas to 110° C., with the inclusion of a reflux condenser. Within 3 hours a mixture consisting of 192 g hydroxyethyl acrylate, 137 g butanediol monoacrylate, 228 g glycidyl methacrylate, 364 g 2-ethylhexyl acrylate, 439 g butyl methacrylate, 438 g methyl methacrylate, 90 g styrene and 44 g azobisisobutyronitrile are added. Then a temperature of 110° C. is held for 1 hour, 6 g azobisisobutyronitrile are added, and this procedure is repeated after a further hour. After 3 hours at 110° C. a solids content of 72.2% by weight is obtained, and after dilution to 60% by weight with butoxyethanol a viscosity of 2.14 Pa.s at 25° C. is determined. After cooling to 50° C. a mixture of 129 g diethyl amine and 201 g isopropanol is quickly added (1.10 mol amine to 1.00 mol epoxide). After 30 min, heating is effected to 65° C. and this temperature is held for 1 hour, then heating is effected to 105° C. and this temperature is held for 3 hours. After cooling to 80° C., isopropanol and amine excess are carefully distilled off in a vacuum. The solids content is adjusted with butoxyethanol to 78% by weight.

A resin is obtained having a number average molecular weight of 11000 (determined by gel permeation chromatography, polystyrene standard).

Final values:
hydroxyl number 115.2 mg KOH per g of solid resin
solids content 78.7% by weight (30 min 150° C.)
amine number 45 mg KOH per g of solid resin
viscosity 3.44 Pa.s (after diluting to 60% by weight with butoxyethanol)

The resin solution is neutralised with formic acid (degree of neutralisation 50%) and diluted with demineralised water to give a solids content of 30%.

EXAMPLE 6b 725 g butoxyethanol are heated under inert gas to 110° C. with the inclusion of a reflux condenser Within 3 hours a mixture is added consisting of 20.7 g butanediol diacrylate, 192 g hydroxylethyl acrylate, 137 g butanediol monoacrylate, 251 g glycidyl methacrylate, 364 g 2-ethylhexyl acrylate, 439 g butyl methacrylate, 438 g methyl methacrylate, 90 g styrene and 44 g azobisisobutyronitrile. Then the mixture is held for 1 hour at 110° C., 6 g azobisisobutyronitrile are added, and this procedure is repeated after a further hour. After 3 hours at 110° C. a solids content is obtained of 71.2% by weight (30 min 180° C.) and after dilution to 50% by weight with butoxyethanol a viscosity of 2650 mPa.s determined at 25° C. After cooling to 50° C. a mixture of 142 g diethyl amine and isopropanol is quickly added (1.10 mol amine to 1.00 mol epoxide). After 30 min the mixture is heated to 65° C., held for 1 hour, then heated up to 105° C. and held at this temperature for 3 hours. After cooling to 80° C., isopropanol and amine excess are carefully distilled off in a vacuum.

Final values:
hydroxyl number 116.4 mg KOH per g of solid resin
solids content 77.2% by weight (30 min 180° C.)
amine number 46 mg KOH per g of solid resin
viscosity 4.2 Pa.s (after diluting to 50% by weight with butoxyethanol)

The resin solution is neutralised with formic acid (degree of neutralisation 50%) and diluted with demineralised water to give a solids content of 30% by weight.

EXAMPLE 6c 328 g butoxyethanol are heated to 85° C. Then a mixture consisting of 300 g N,N-dimethylaminoethyl methacrylate, 220 g hydroxyethyl acrylate, 350 g butyl acrylate, 130 g styrene, 20 g azobisisobutyronitrile and 100 g butoxyethanol are added uniformly within 5 hours. Then the mixture is held for a further 2 hours at 90° C. A resin is obtained having an amine number of 107.0 mg KOH per g of solid resin and a hydroxyl number of 106.2 mg KOH per g of solid resin. After neutralisation with formic acid (degree of neutralisation 50%), dilution is effected with demineralised water to give a solids content of 30% by weight.

The following Examples describe the production of CEL baths and the application thereof.

EXAMPLES 7a–k

To 1700 g of a dispersion according to Examples 3a–k 600 g of a pigment paste according to Example 4 are added with vigorous stirring. Further dilution is then effected with 1700 g of fully demineralised water. Substances which cause cratering (see following tables) are added to the baths and the mixture is thoroughly homogenised. Conventional steel plates treated with zinc phosphate are coated from these CEL baths (layer thickness about 20 μm) and stoving is effected at 170° C. for 30 min. The surface and the adhesion of polyvinylchloride (PVC) materials to the surface are assessed (see following Tables).

TABLE 1

Addition of 4 g ASTM oil No. 1 (commercial product

TABLE 1-continued available from Fuchs-Mineralölwerke GmbH, Mannheim) as crater-forming agent.

| Bath No. | 7a | 7b | 7i | 7f | 7g | 7h |
|---|---|---|---|---|---|---|
| | | Reference | | | Invention | |
| Assessment | −/+ | −/+ | −/− | in each case +/+ | | |

−/− surface cratered, PVC adhesion affected
−/+ surface cratered, PVC adhesion OK
+/− surface crater-free, PVC adhesion affected
+/+ surface crater-free, PVC adhesion OK

TABLE 2

Addition of 4 g (solid) of a styrene- or vinyltoluene-modified alkyd resin as 10% solution in xylene/butoxyethanol 1:1, Vialkyd AV 462 available from Vianova Kunstharz AG, Graz:

| Bath No. | 7a | 7b | 7c | 7i | 7k | 7d 7e 7f 7g 7h |
|---|---|---|---|---|---|---|
| | | Reference | | | | Invention |
| Assessment | −/+ | −/+ | −/+ | −/− | −/+ | in each case +/+ |

TABLE 3

Addition of 4 g Anticorrit 15 N-68, available from Fuchs-Mineralölwerke GmbH, Mannheim.

| Bath No. | 7a (Reference) | 7h (Invention) |
|---|---|---|
| Assessment | −/+ | +/+ |

TABLE 4

Addition of a mixture of the crater-forming agents according to Tables 1 and 2

| Bath No. | 7b | 7c | 7i | 7f | 7g | 7h |
|---|---|---|---|---|---|---|
| | | Reference | | | Invention | |
| Assessment | −/+ | −/+ | −/− | in each case +/+ | | |

TABLE 5

Addition of a mixture of the crater-forming agents according to Tables 1, 2 and 3

| Bath No. | 7a | 7i | 7h |
|---|---|---|---|
| | Reference | | Invention |
| Assessment | −/+ | −/− | +/+ |

The corrosion-protection characteristics of the various coatings are comparable and good results are achieved. The PVC materials are conventional underbody-protection materials commercially available from Dr. A Stankiewicz GmbH, Celle und Teroson GmbH, Heidelberg; they are spread by blade in a 3 mm layer, stoved for 10 min at 140° C., and 1 hour later the adhesion between primer and PVC is tested by making a cut.

We claim:

1. Aqueous baths for electrophoretic lacquering containing binding agents capable of cathodic deposition and containing as additives for enhancing surface appearance
   0.1 to 3% by weight of one or several (meth)acrylic copolymers with an amine number of 15–150 and an OH-number of 15–450, together with
   0.1 to 2% by weight of one or several polyesters with β-hydroxyalkyl ester groups, with an acid number of 0 to 3 and a weight average molecular weight of 1000 to 10000, and together with
   0.1 to 5% by weight of one or several homopolymers or copolymers of one or several alkylvinyl ethers with 1–5 carbon atoms in an alkyl residue thereof, with a weight average molecular weight of 500 to 10000,
   whereby the percentages by weight relate to a solids content of the binding agents.

2. Baths for electrophoretic lacquering according to claim 1, characterised in that the polyesters with β-hydroxyalkyl ester groups are chosen in such a way that they are only miscible to a limited extent with the binding agents contained in the bath for electrophoretic lacquering.

3. Process for coating substrates which conduct electricity comprising the steps of:
   dipping a substrate as cathode into an aqueous bath for electrophoretic lacquering containing binding agents which are deposited cathodically,
   cathodically depositing a lacquer film on the substrate,
   removing the substrate from the electrophoretic-lacquering bath, and
   storing the lacquer film, wherein the aqueous bath comprises an aqueous electrophoretic lacquering bath to which have been added as additives for enhancing surface appearance:
   0.1 to 3% by weight of one or several (meth)acrylic copolymers with an amine number of 15–150 and an OH-number of 15–450,
   0.1 to 2% by weight of one or several polyesters with β-hydroxyalkyl ester groups, with an acid number of 0 to 3 and a weight average molecular weight of 1000 to 10000, and
   0.1 to 5% by weight of one or several homopolymers or copolymers of one or several alkylvinyl ethers with 1 to 5 carbon atoms in an alkyl residue thereof, with a weight average molecular weight of 500 to 10000,
   whereby the percentages by weight relate to a solids content of the binding agents.

4. Process according to claim 3, characterised in that one or several polyesters with β-hydroxyalkyl ester groups have been added, said polyesters having been chosen in such a way that they are only miscible to a limited extent with the binding agents contained in the bath for electrophoretic lacquering.

5. A process for coating substrates which conduct electricity comprising the steps of:
   dipping the substrate as cathode into an aqueous bath for electrophoretic lacquering containing binding agents which are deposited cathodically,
   cathodically depositing a lacquer film on the substrate,
   removing the substrate from the electrophoretic-lacquering bath, and
   stoving the lacquer film, wherein the aqueous bath comprises an aqueous electrophoretic lacquering bath to which have been added as additives for enhancing surface appearance in aqueous baths for electrophoretic lacquering containing binding agents capable of cathodic deposition:
   one or several (meth)acrylic copolymers with an amine number of 15–150 and an OH-number of 15–450,
   one or several polyesters with β-hydroxyalkyl ester groups, with an acid number of 0 to 3 and a weight average molecular weight of 1000 to 10000, and
   one or several homopolymers or copolymers of one or several alkylvinyl ethers with 1 to 5 carbon atoms in an alkyl residue thereof, with a weight average molecular weight of 500 to 10000.

6. A process according to claim 5, wherein the parts by weight of the (meth)acrylic copolymers in relation to the polyesters and the parts by weight of the (meth)acrylic copolymers in relation to the homopolymers or copolymers of alkylvinyl ethers are in each case in a ratio of 1:10 to 10:1, in each case relative to the solids content of the resin, and in the case of combination of (meth)acrylic copolymers with polyesters and homopolymers or copolymers of alkylvinyl ethers are in each case in a ratio 1:1:10 to 1:10:1 or 10:1:1, in each case relative to a solids content of the resin.

7. A process for coating substrates which conduct electricity comprising the steps of:

dipping the substrate as cathode into an aqueous bath for electrophoretic lacquering containing binding agents which are deposited cathodically, cathodically depositing a lacquer film on the substrate, removing the substrate from the electrophoretic-lacquering bath, and stoving the lacquer film, wherein the aqueous bath comprises an aqueous electrophoretic lacquering bath to which have been added as an anti-cratering agent for enhancing surface appearance:

one or several (meth)acrylic copolymers with an amine number of 15-150 and an OH-number of 15-450, one or several polyesters with $\beta$-hydroxyalkyl ester groups, with an acid number of 0 to 3 and a weight average molecular weight of 1000 to 10000, and one or several homopolymers or copolymers of one or several alkylvinyl ethers with 1 to 5 carbon atoms in an alkyl residue thereof, with a weight average molecular weight of 500 to 10000.

8. A process according to claim 7, wherein the parts by weight of the (meth)acrylic copolymers in relation to the polyesters and the parts by weight of the (meth)acrylic copolymers in relation to the homopolymers or copolymers of alkylvinyl ethers are in each case in a ratio of 1:10 to 10:1, in each case relative to the solids content of the resin, and in the case of combination of (meth)acrylic copolymers with polyesters and homopolymers or copolymers of alkylvinyl ethers are in each case in a ratio 1:1:10 to 1:10:1 or 10:1:1, in each case relative to a solids content of the resin.

* * * * *